United States Patent
Jang et al.

(10) Patent No.: US 11,204,975 B1
(45) Date of Patent: Dec. 21, 2021

(54) PROGRAM INTERFACE REMOTE MANAGEMENT AND PROVISIONING

(71) Applicant: Coupang Corp., Seoul (KR)

(72) Inventors: Yong Seok Jang, Seoul (KR); Eun Young Kim, Seoul (KR); Seul Ki Lim, Gyeonggi-do (KR); Yinhao Liang, Shanghai (CN)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/988,818

(22) Filed: Aug. 10, 2020

(51) Int. Cl.
| | |
|---|---|
| *G06F 16/955* | (2019.01) |
| *G06F 9/54* | (2006.01) |
| *H04L 29/08* | (2006.01) |
| *G06F 9/451* | (2018.01) |
| *G06F 16/958* | (2019.01) |

(52) U.S. Cl.
CPC ......... *G06F 16/9566* (2019.01); *G06F 9/451* (2018.02); *G06F 9/54* (2013.01); *G06F 16/986* (2019.01); *H04L 67/306* (2013.01)

(58) Field of Classification Search
CPC .................................... G06F 8/36; G06F 9/54
See application file for complete search history.

(56) References Cited

U.S. PATENT DOCUMENTS

| | | | | |
|---|---|---|---|---|
| 7,139,974 B1 * | 11/2006 | Bascom | ................ | G06F 16/288 715/236 |
| 7,363,260 B1 * | 4/2008 | Stamler | ................ | G06Q 10/087 705/28 |
| 8,788,295 B1 * | 7/2014 | Wargin | ................ | G06Q 40/08 705/4 |
| 8,819,542 B2 * | 8/2014 | Cudich | ................ | G06F 40/10 715/243 |
| 9,934,394 B1 * | 4/2018 | Stolboushkin | ...... | G06F 21/6218 |
| 10,402,049 B1 * | 9/2019 | Lyman | ...... | G06F 8/38 |
| 10,671,378 B2 * | 6/2020 | Jaladi | ...... | G06F 8/658 |
| 10,877,877 B1 * | 12/2020 | Lee | ...... | G06F 11/3692 |

(Continued)

FOREIGN PATENT DOCUMENTS

| | | |
|---|---|---|
| CN | 103914484 A | 7/2014 |
| CN | 110717801 A | 1/2020 |

(Continued)

OTHER PUBLICATIONS

International Search Report and Written Opinion in counterpart PCT Application No. PCT/IB2021/051253 dated May 11, 2021 (10 pages).

(Continued)

*Primary Examiner* — Ryan F Pitaro
(74) *Attorney, Agent, or Firm* — Finnegan, Henderson, Farabow, Garrett & Dunner, LLP

(57) ABSTRACT

Disclosed herein are systems and methods for a system for distributing user requests. The system may comprise a memory storing instructions and at least one processor configured to execute the instructions to perform operations. The operations may include: receiving, from a user device: a reference, a target computing interface, and a request to assign the reference to the target computing interface; specifying a function provider associated with the target computing interface; enabling the target computing interface for configuration by the specified function provider; and providing the reference to at least one consumer device.

20 Claims, 10 Drawing Sheets

(56) References Cited

U.S. PATENT DOCUMENTS

| | | | | |
|---|---|---|---|---|
| 2003/0084091 A1* | 5/2003 | Agarwalla | .......... | H04L 67/2814 709/203 |
| 2004/0068731 A1* | 4/2004 | Davis | .................. | G06F 9/4868 719/310 |
| 2010/0036933 A1* | 2/2010 | Breau | .................. | G06F 16/951 709/218 |
| 2010/0318596 A1* | 12/2010 | Bergman | ................ | H04L 67/16 709/203 |
| 2013/0031493 A1* | 1/2013 | Ritter | ........................ | G06F 8/38 715/762 |
| 2013/0139043 A1* | 5/2013 | Patel | .................... | G06F 16/958 715/205 |
| 2013/0311875 A1* | 11/2013 | Pappas | .................... | G06F 40/14 715/234 |
| 2014/0059415 A1* | 2/2014 | Bailey | .................... | G06Q 10/06 715/224 |
| 2014/0095463 A1* | 4/2014 | Pappas | ................... | G06F 16/951 707/706 |
| 2014/0196020 A1* | 7/2014 | Shetty | ..................... | G06F 8/658 717/171 |
| 2014/0249964 A1 | 9/2014 | Kubicki | | |
| 2015/0256589 A1* | 9/2015 | Newburn | ................ | H04L 67/28 709/203 |
| 2015/0288541 A1* | 10/2015 | Fargano | .................. | H04L 43/08 709/225 |
| 2016/0026514 A1* | 1/2016 | Cucinotta | ................ | G06F 9/54 718/105 |
| 2016/0109875 A1* | 4/2016 | Majewski | ........... | G06F 21/6227 700/98 |
| 2016/0162172 A1 | 6/2016 | Rathod | | |
| 2017/0124617 A1* | 5/2017 | Spoelstra | ........... | G06Q 30/0621 |
| 2017/0249726 A1* | 8/2017 | Rochford | ................ | G06F 1/163 |
| 2017/0257896 A1* | 9/2017 | Zong | .................... | H04L 65/4076 |
| 2017/0293496 A1 | 10/2017 | Offenhartz et al. | | |
| 2018/0173522 A1* | 6/2018 | Hamill | ...................... | G06F 8/60 |
| 2018/0210745 A1* | 7/2018 | Raheja | .................... | G06F 9/466 |
| 2018/0246983 A1* | 8/2018 | Rathod | .............. | G06F 16/9535 |
| 2018/0367944 A1* | 12/2018 | Heo | ..................... | H04W 12/50 |
| 2019/0026082 A1* | 1/2019 | Shalev | .................. | G06F 40/186 |
| 2019/0079755 A1* | 3/2019 | Jones | .................. | G06F 9/44536 |
| 2019/0332230 A1* | 10/2019 | Gueco | .................. | G06F 11/3006 |
| 2019/0370709 A1* | 12/2019 | Hodges | .............. | G06Q 10/0637 |
| 2020/0175537 A1 | 6/2020 | Hudson et al. | | |

FOREIGN PATENT DOCUMENTS

| | | |
|---|---|---|
| CN | 110730975 A | 1/2020 |
| CN | 111368174 A | 7/2020 |
| CN | 111400345 A | 7/2020 |
| KR | 10-1762861 B1 | 7/2017 |
| TW | I462043 | 11/2014 |

OTHER PUBLICATIONS

Taiwan Intellectual Property Office Office Action and Search Report dated Sep. 7, 2021 in counterpart Application No. 110100369 (16 pages).

Taiwan Intellectual Property Office Rejection Decision dated Oct. 22, 2021 in counterparent Application No. 110100369 (12 pages).

* cited by examiner

Favorites  Application                                           login  Sign Up  Service center

[all]

My Account  Shopping Cart

Shipments  Fast Shipments  Christmas  Gold deals  Regular delivery  Events / Coupons  Planned Exhibition
                            Gift Cards Home > Food > Daily products / ice cream > Cheese > Fresh cheese > Mozzarella mozzarella cheese

285 Reviews     20,000 won

FREE Shipping
Tomorrow (Wed) 11/28 Arrival Guarantee

Weight per piece x Quantity : 1kg x 2 pieces

| 1 | Add to cart | Buy now |

- Country of origin: See product description
- Shelf Life: 2019-11-04
- Total quantity: 2
- Cheese form: crushed (powder)
- Item Number: 23532 - 3432551

Products purchased by other customers

| Rosé spaghetti sauce, 600g, 2... | Chunky Tomato Pasta... | Grated Parmesan cheese, | Bacon and Mushroom Cream Pasta Sauce | Chili sauce, 295ml, 1 | Hot sauce, |
|---|---|---|---|---|---|
| 6,500 won | 3,800 won | 6,460 won | 4,870 won | 2,370 won | 2,340 won |
| (54 won per 10g) | (86 won per 10g) | (285 won per 10g) | (108 won per 10g) | (80 won per 10ml) | (66 won per 10ml) |
| (3,721) | (545) | (1,330) | (3,193) | (2,552) | (245) |

| Product Details | Reviews (285) | Contact Us | Shipping & Returns |

Required notation information

| Type of food | Natural cheese / frozen products | Producers and Locations | Cheese Corp. / Republic of Korea |
|---|---|---|---|
| Date of manufacture, shelf life or quality maintenance | Shelf Life: Products manufactured on or after November 04, 2019 : Manufactured goods after May 19, 2018 | Capacity (weight), quantity by packing unit | 1kg, 2 pieces |
| Ingredients and | Content reference | nutrient | None |

PROGRAM INTERFACE REMOTE MANAGEMENT AND PROVISIONING

TECHNICAL FIELD

The present disclosure generally relates to computerized systems and methods for assigning an endpoint proxy-accessible reference to a target computing interface. In particular, embodiments of the present disclosure relate to inventive and unconventional systems relate to integrating modules from remote function providers into computing interfaces. Some embodiments include assigning a reference to a computing interface, allowing for retrieval by a consumer device to provide enhanced functionality.

BACKGROUND

When configuring computing interfaces and modules for devices, a configuring device often needs to access multiple different services, and may need to perform a lengthy sequence of service requests. For example, to configure a software element, such as a computing interface, a mobile device may need to send multiple service requests to multiple service providers. In some cases, some service requests may not be sent until another service request is completed, or service requests may have to be sent through a separate system from a system performing the requests.

Traditional systems and methods for configuring computing interfaces may be ill-equipped for permitting fast and seamless performance of service requests that may otherwise burden processing and network resources of mobile devices. For example, a mobile device may need to communicate to a service provider through a conduit system, straining networking resources of that system as well as slowing communications to and from the mobile device. Moreover, to perform multiple service requests, a mobile device may have to interact with multiple applications, further slowing progress toward a desired result, such as a reconfigured computer interface. And, as yet another drawback, many current platforms are unable to support asynchronous requests from mobile devices, because certain application programming interfaces are separated from business logic.

Therefore, there is a need for improved methods and systems for assigning an endpoint proxy-accessible reference to a target computing interface.

SUMMARY

One aspect of the present disclosure is directed to a system for assigning a reference to a target computing interface. The system may comprise a memory storing instructions and at least one processor configured to execute the instructions to perform operations. The operations may include: receiving, from a user device: a reference, a target computing interface, and a request to assign the reference to the target computing interface; specifying a function provider associated with the target computing interface; enabling the target computing interface for configuration by the specified function provider; and providing the reference to at least one consumer device.

In accordance with further embodiments, the reference may refer to a web resource and may specify a location of the web resource on a computer network.

In accordance with further embodiments, the reference may specify a mechanism for retrieving the web resource.

In accordance with further embodiments, the reference may comprise a uniform resource locator (URL).

In accordance with further embodiments, the target computing interface may be configured to provide extension mechanisms to enable the at least one consumer device to extend existing functionality.

In accordance with further embodiments, the configuration may comprise associating at least one module with the target computing interface.

In accordance with further embodiments, the at least one module may comprise a selectable element configured to direct to a destination when selected.

In accordance with further embodiments, the at least one module is stored in a database.

In accordance with further embodiments, the specified function provider may be configured to build a page associated with the reference.

In accordance with further embodiments, the target computing interface may be configured to be accessible to a set of predefined users.

In accordance with further embodiments, the target computing interface may be further configured to implement a plurality of modules from different libraries sharing a common programming interface.

Another aspect of the present disclosure is directed to a method for for assigning a reference to a target computing interface. The method may comprise: receiving, from a user device: a reference, a target computing interface, and a request to assign the reference to the target computing interface; specifying a function provider associated with the target computing interface; enabling the target computing interface for configuration by the specified function provider; and providing the reference to at least one consumer device.

In accordance with further embodiments, the reference may refer to a web resource and specifies the location of the web resource on a computer network.

In accordance with further embodiments, the reference may specify a mechanism for retrieving the web resource.

In accordance with further embodiments, the target computing interface may be configured to provide extension mechanisms to enable the at least one consumer device to extend existing functionality.

In accordance with further embodiments, the configuration may comprise associating at least one module with the target computing interface.

In accordance with further embodiments, the at least one module may comprise a selectable element configured to direct to a destination when selected.

In accordance with further embodiments, the at least one module may be stored in a database.

In accordance with further embodiments, the specified function provider may be configured to build a page associated with the reference.

Yet another aspect of the present disclosure is directed to a system for provisioning computing interfaces. The system may comprise a memory storing instructions; and at least one processor configured to execute the instructions to perform operations. The operations may comprise: receiving, from a user device: a reference, a target computing interface, and a request to assign the reference to the target computing interface; specifying a function provider associated with the target computing interface; receiving, from the function provider, at least one module; providing the reference to at least one consumer device; and providing, in response to a selection of the reference at a consumer device, the at least one module within the target computing interface.

Other systems, methods, and computer-readable media are also discussed herein.

BRIEF DESCRIPTION OF THE DRAWINGS

FIG. 1C depicts a sample Single Detail Page (SDP) that includes a product and information about the product along with interactive user interface elements, consistent with the disclosed embodiments.

DETAILED DESCRIPTION

Figure 1A:
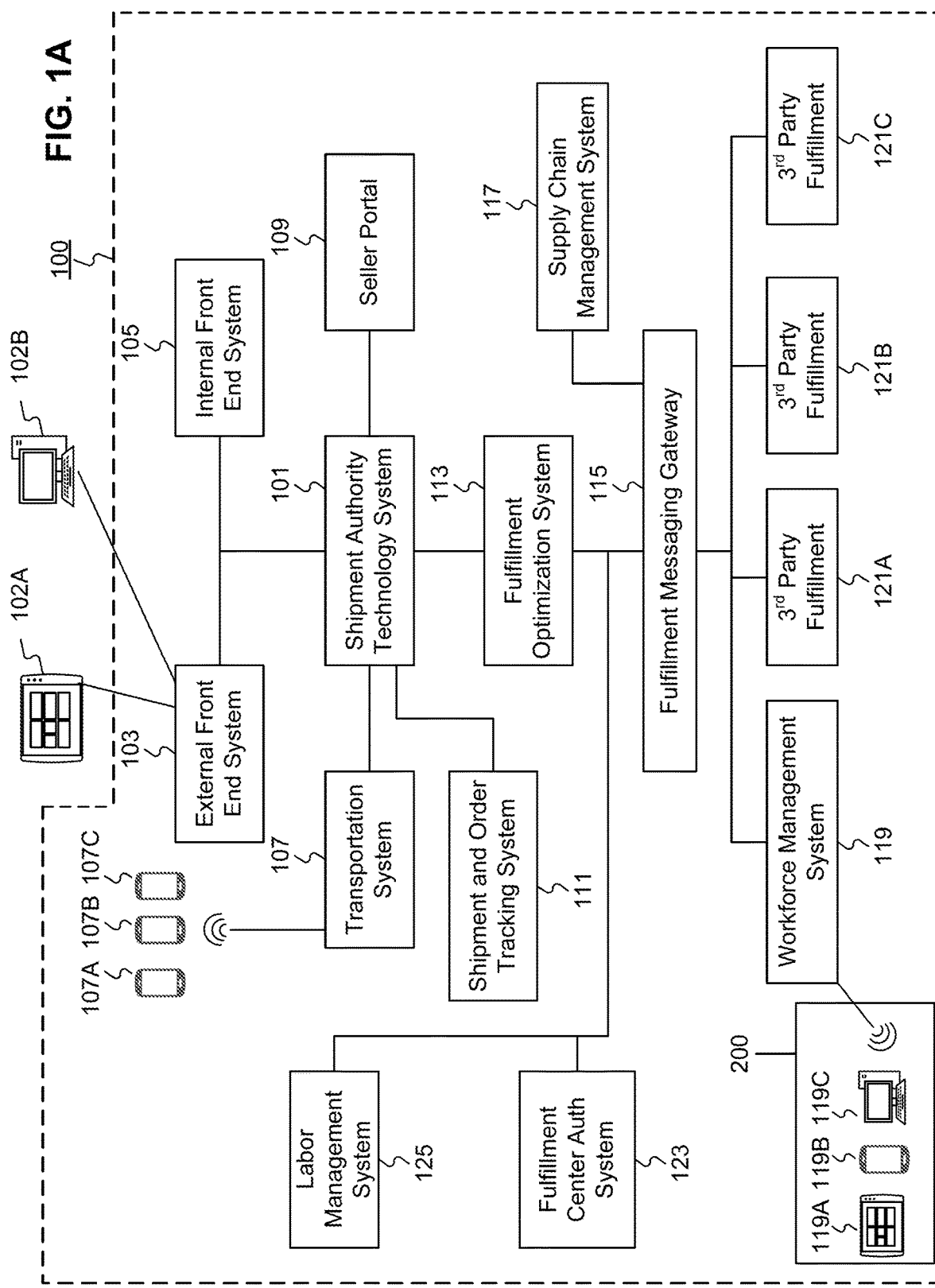
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for remotely configuring computing interfaces using an endpoint proxy.

Referring to FIG. 1A, a schematic block diagram 100 illustrating an exemplary embodiment of a system comprising computerized systems for communications enabling shipping, transportation, and logistics operations is shown.

As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3rd party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
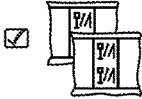
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3rd party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
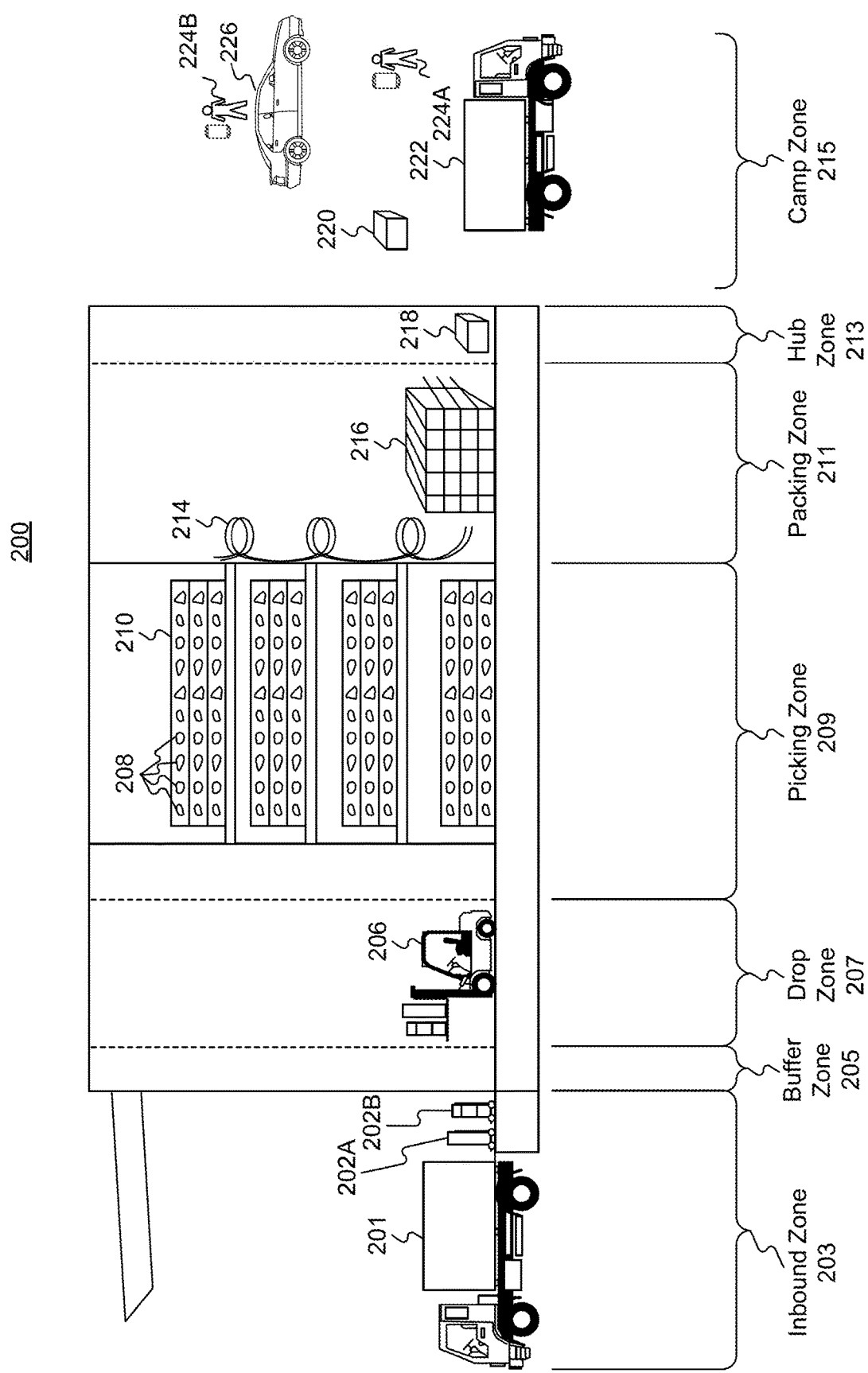
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
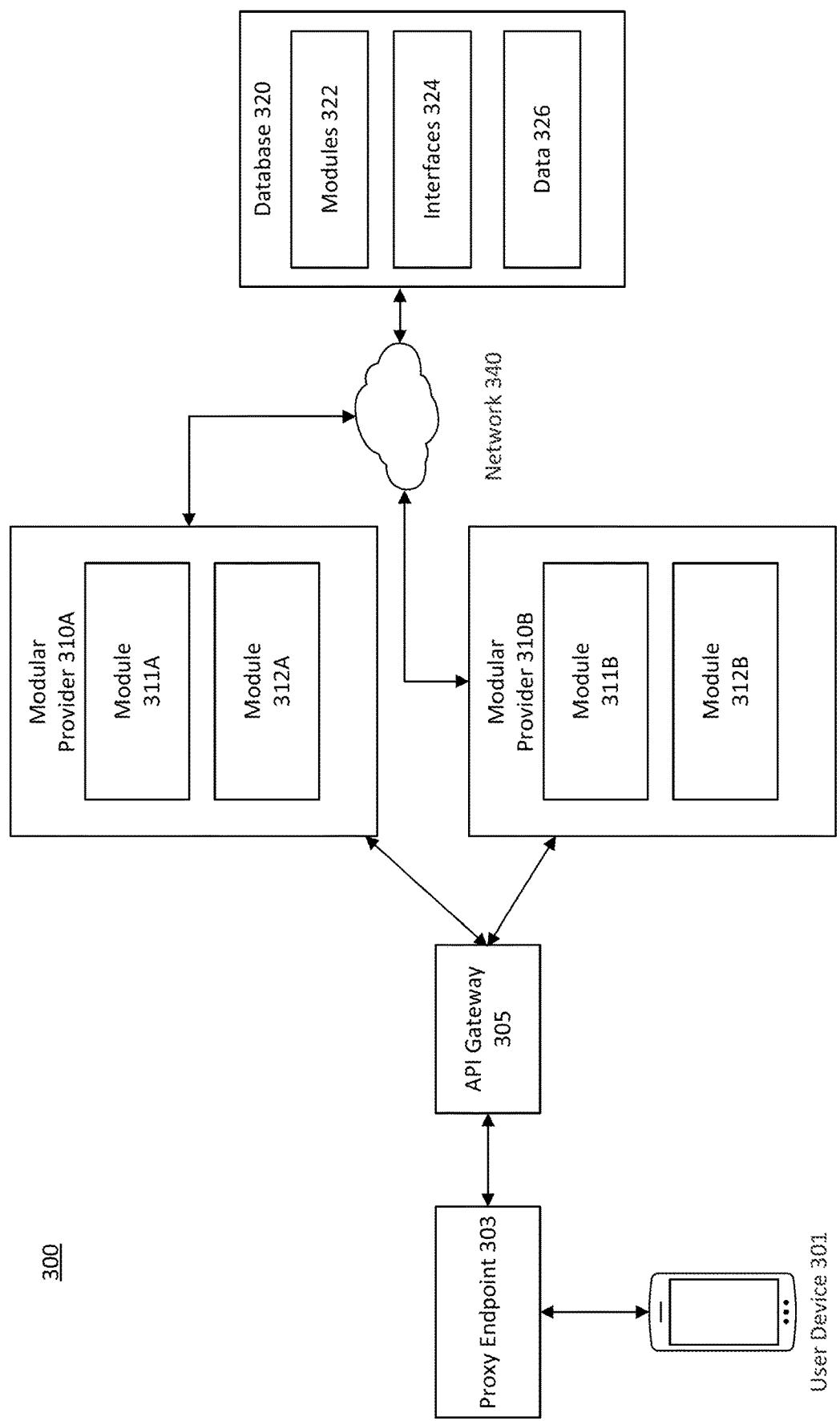
FIG. 3 illustrates an exemplary pictographic representation of a module management system, consistent with disclosed embodiments.

FIG. 3 illustrates an exemplary pictographic representation of a module management system 300, consistent with disclosed embodiments. Module management system 300 may include a user device 301, which may be a mobile phone, laptop, personal computer, server, or other device configured to communicate with API gateway 305. User device 301 may communicate with API gateway 305 using proxy endpoint 303. Proxy endpoint 303 may be an application, program, module, or other software that acts as a conduit through which user device 301 may access API gateway 305, which it may not have been otherwise able to access. For example, proxy endpoint 303 may provide an interactive user interface, API, uniform resource locator (URL), module identifier, API identifier, reference, informational tag, and/or other information related to an API or module, with which a user may view and/or manipulate at user device 301. For example, after interacting with a user interface of the proxy endpoint 303, user device 301 may generate a module and/or module association (described further with respect to FIG. 6).

In some embodiments, user device 301 may be communicably coupled to API gateway 305. For example, user device 301 may connect to API gateway 305 wirelessly, such as through a network (e.g., an instance of network 340, described below). API gateway 305 may include a server, a router, a switch, an adapter, a group of networked devices, network interface, or other computing device. API gateway 305 may also include a module platform "core" which may include software components of a page loader (e.g., for loading pages within the mobile proxy for viewing and interaction at user device 301) and/or an endpoint mapper. In some embodiments, API gateway 305 may operate using a mobile Application Program Interface (MAPI), according to which it may transmit and/or receive communications. In some embodiments, API gateway 305 may include a synchronous request controller and/or asynchronous request controller, which may allow a user device to perform asynchronous requests to configure a computing interface and/or assign a reference. By being configured for asynchronous requests, API gateway 305 may perform operations to complete a request from a user device (e.g., user device 301), while allowing the user device to continue performing operations (e.g., using an endpoint proxy). Moreover, API gateway 305 may be configured to receive a request from a user device while performing operations to satisfy an earlier received request. API gateway 305 may be communicably coupled to any number of modular providers, such as modular provider 310A and modular provider 310B. A modular provider may be an adapter, a server, a database, or other computer devices configured to generate, store, and/or retrieve modules. In some embodiments, a modular provider may store modules (e.g., in a local memory component), which the respective modular provider may have generated or otherwise manipulated. For example, modular provider 310A may store module 311A and 312A, and modular provider 310B may store module 311B and 312B. A module stored at a modular provider may be associated with a least one reference, or may have no associated reference.

In some embodiments, a module may be configured for implementation at a consumer device (e.g., mobile phone). For example, a module may include a user interface, an image, an animation, a video, text, an interactive user interface element, audio information, a reference, a module identifier, a URL, a cryptographic key (e.g., for networked transactions), and/or any other information for sending to a consumer device. In some embodiments, a module may include a selectable element configured to direct to a destination when selected. For example, upon selection, the selectable element may cause a current computing interface (e.g., displayed at a consumer device) to change currently displayed modules to a new set of modules, which may be associated with different functions (e.g., viewing an image of a product, completing and electronic payment, etc.) and/or may be associated with a different source (e.g., a modular provider).

In some embodiments, modular providers 310A and 310B may be communicably coupled to a network 340. Network 340 may be a public network or private network and may include, for example, a wired or wireless network, including, without limitation, a Local Area Network (LAN), a Wide Area Network (WAN), a Metropolitan Area Network, an IEEE 802.11 wireless network (e.g., "Wi-Fi"), a network of networks (e.g., the Internet), a land-line telephone network, or the like. Network 340 may be connected to other networks (not depicted in FIG. 3) to connect the various system components to each other and/or to external systems or devices. In some embodiments, network 340 may be a secure network and require a password to access the network. By having modular providers remote from a user device, yet accessible using a proxy endpoint, a user device may have service requests (which may be asynchronous) fulfilled without the processing resources of the user device being strained.

In some embodiments, a module provider may connect to a database 320, such as through network 340. Database 320 may store modules 322 (which may include any of module 311A, 312A, 311B, and/or 312B), interfaces 324, and/or data 326 (e.g., within a memory component). In some embodiments, modules 322 may include modules that have been modified and/or linked to references (e.g., according to process 600). In some embodiments, interfaces 324 may include computing interfaces to which modules have been integrated (e.g., according to process 600). In some embodiments, data 326 may include routing data, log data (e.g., interface or module modification history data), and/or any other data using to manage modules or interfaces, consistent with disclosed embodiments. Database 320 may include a cloud-based database (e.g., a Relational Database Service (RDS)) or an on-premises database. Database 320 may include data received from one or more components of module management system 300 and/or computing components outside module management system 300 (e.g., via network 340).

Figure 4:
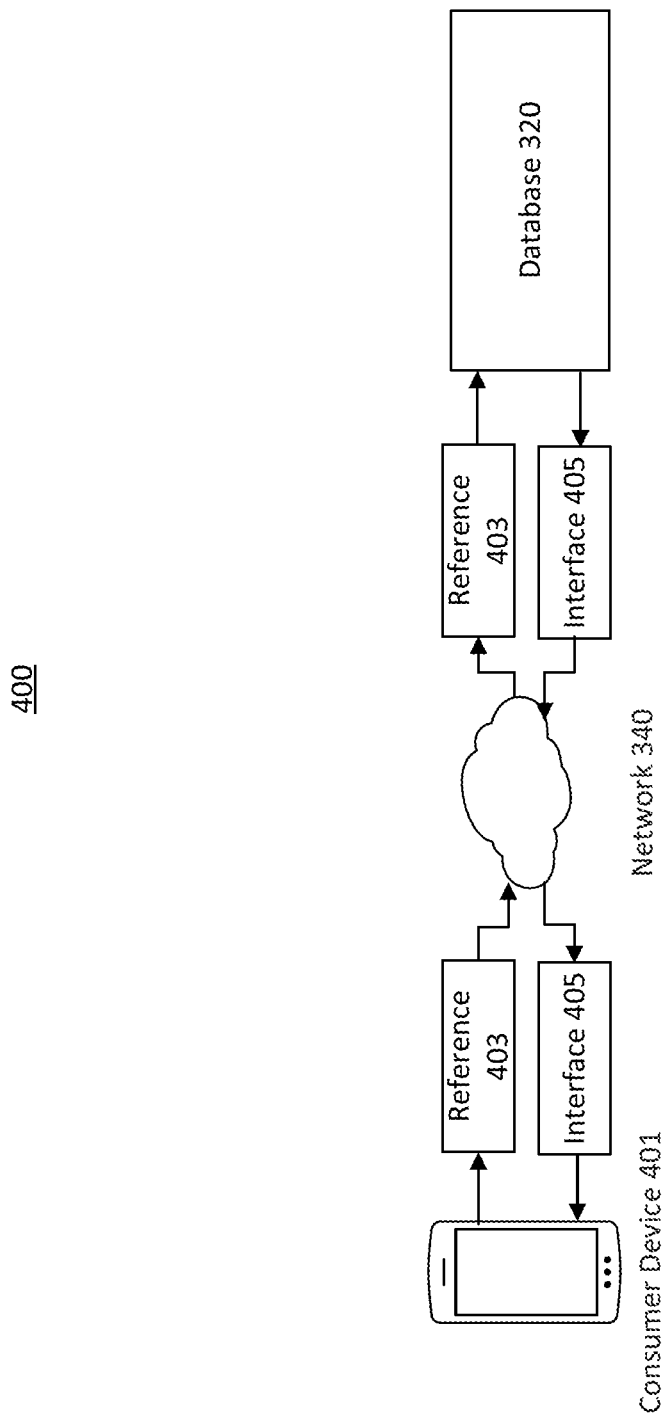
FIG. 4 illustrates an exemplary pictographic representation of an interface provisioning process, consistent with disclosed embodiments.

FIG. 4 illustrates an exemplary pictographic representation of an interface provisioning process 400, consistent with disclosed embodiments. In some embodiments, a consumer device 401 (e.g., mobile device) may transmit a reference 403. A reference 403 may include a URL, API call, user identifier, device identifier, informational tag, and/or any other information for identifying an interface. In some embodiments, reference 403 may be encrypted and/or hashed, to create a secure service request or combination of service requests, which may include personally identifiable information (PII). In some embodiments, consumer device 401 may transmit reference 403 to a network, such as network 340.

After receiving reference 403, network 340 may route reference 403 to another device. For example, network 340 may transmit reference 403 to a database 320, which may maintain a module and/or interface associated with reference 403. In some embodiments, network 340 may transmit reference 403 to a database management device (not shown), which may determine a database 320 to which to transmit reference 403. For example, multiple databases 320 may maintain different modules and/or interfaces, and a database management device may determine, such as based on a reference 403 or other information received from a consumer device 401, a specific database 320 to which to transmit reference 403.

After receiving reference 403, database 320 may parse reference 403 to determine a module and/or interface associated with reference 403. By way of example, database 320 may determine, based on the reference, that an interface 405, which may have a particular combination of modules, is associated with reference 403 (e.g., computing interface 500). After determining the appropriate interface 405, database 320 may transmit interface 405 to network 340, through which interface 405 may be transmitted to consumer device 401. In some embodiments, the interface 405 may be altered (e.g., have certain functionality added and/or removed, have modules re-configured) depending on the reference received. For example, some references may be associated with higher functionality interfaces, and some references may be associated with lower functionality interfaces. While these aforementioned steps have been described with respect to database 320, some steps may be instead carried out by API gateway 305 and/or other computing device.

Figure 5:
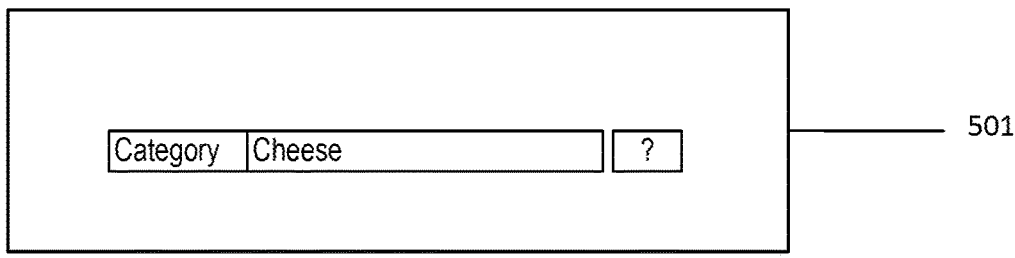
FIG. 5 illustrates an exemplary pictographic representation of a configurable computing interface, consistent with disclosed embodiments.
Figure 5:
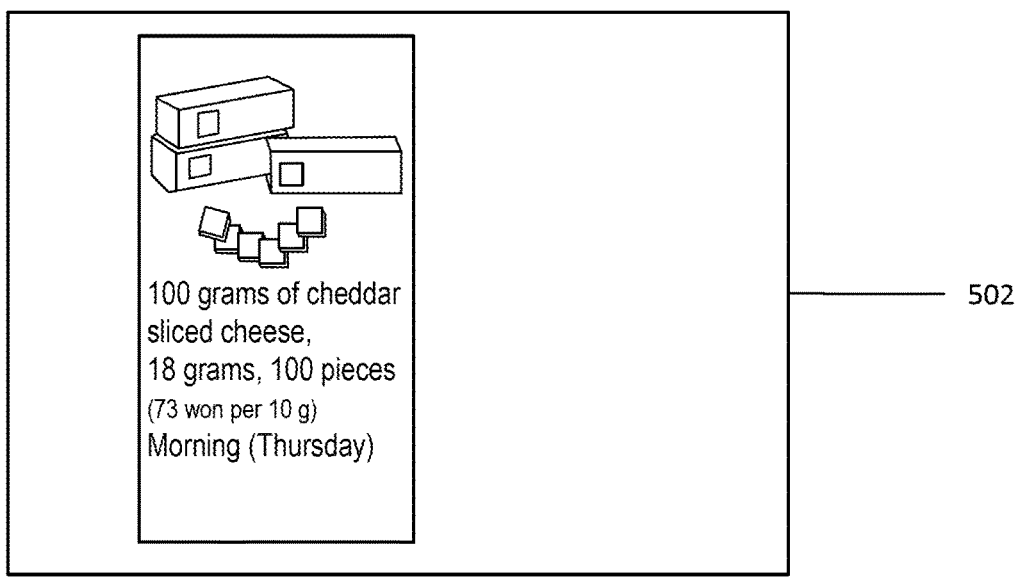
Figure 5:
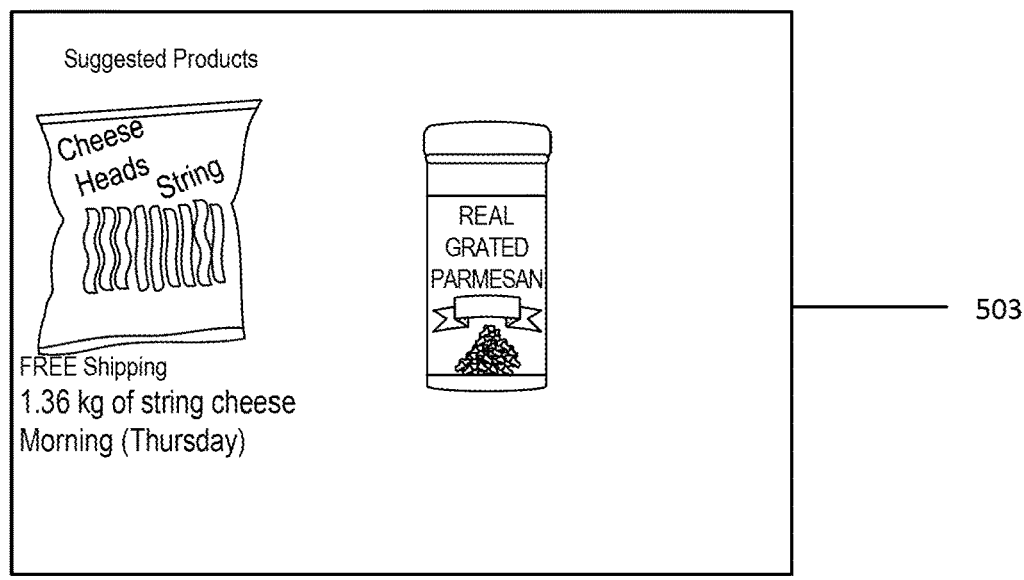

FIG. 5 illustrates an exemplary pictographic representation of a configurable computing interface 500, consistent with disclosed embodiments. In some embodiments, configurable computing interface 500 may be configurable by a user device 301. For example, user device 301 may access configurable computing interface 500 using proxy endpoint 303, and may associate a reference with configurable computing interface 500, integrate modules into configurable computing interface 500, and/or otherwise configure configurable computing interface 500. Configurable computing interface 500 may be transmitted to a user device 301 and/or consumer device 401 in response to a request. For example, a user device may request a computing interface for viewing, associating a reference with, and/or modifying, and a consumer device may request a computing interface for viewing and/or interaction. In some embodiments, configurable computing interface 500 may include a user interface, an image, an animation, a video, text, an interactive user interface element, audio information, a reference, a module identifier, a URL, a cryptographic key (e.g., for networked transactions), and/or any other information for sending to a consumer device. For example, configurable computing interface 500 may include a module 501, which may include selectable user interface elements, which may include a search field, a drop-down menu, a selectable element, a filter, a tab, a sorting element, and the like. In some embodiments, configurable computing interface 500 may also include a module 502, which may include an image, text, animation, video, delivery date estimate, and the like. In some embodiments, configurable computing interface 500 may also include a module 503, which may include suggested product information, which may be based on a user input entered at another module (e.g., module 501). For example, module 503 may include an image of a product associated with a search term entered by a user at module 501. Module 503 may also include any or all of the elements that may be include in module 502 and/or 503. In some embodiments, information containing in a module may be generated at and/or received from system 100. For example, a delivery date estimate may be based on data stored in WMS 119 (e.g., event data generated in response to a scanning action).

Figure 6:
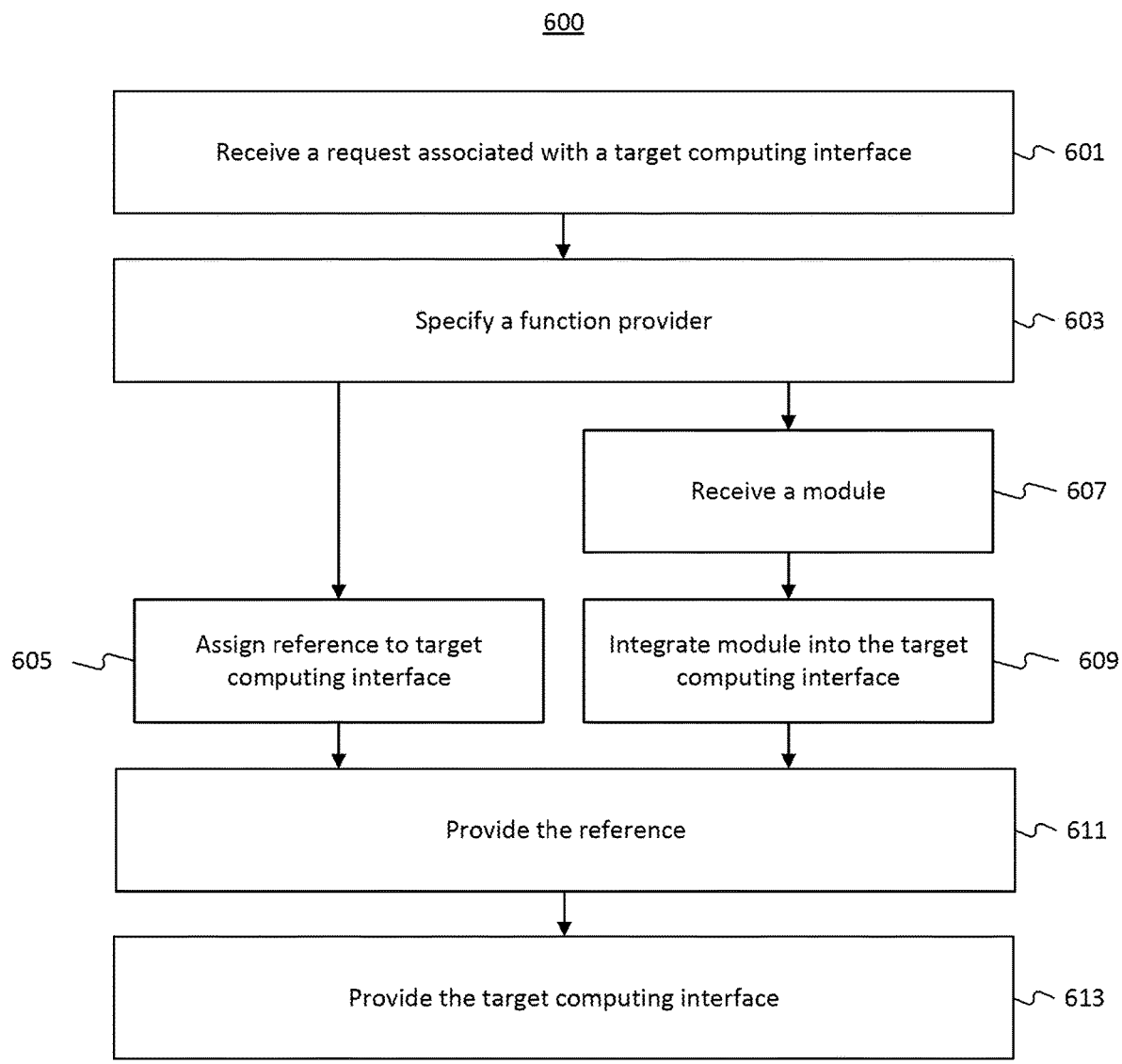
FIG. 6 depicts a flowchart of an exemplary process for configuring and provisioning computing interfaces.

FIG. 6 depicts a flowchart of an exemplary process for configuring and provisioning computing interfaces, which may be performed by a processor in accordance with disclosed embodiments. For example, process 600 may be performed entirely or in part by API gateway 305 (e.g., using a processor). Alternatively or additionally, some steps of process 600 may be performed by user device 301 and other steps may be performed by another device, such as database 320 or other computing device connected to or within module management system 300. While process 600 is described with respect to API gateway 305, one of skill will understand that the steps illustrated in FIG. 6 are exemplary and steps may be added, merged, divided, duplicated, repeated, modified, and/or deleted in some embodiments. While some steps of process 600 may be described as performed by a single device, different steps may be performed by different devices and/or a single step may be performed by multiple devices (e.g., operations to configure a computing interface may be performed by multiple modular providers).

At step 601, API gateway 305 may receive a request associated with a target computing interface. For example, API gateway 305 may receive a request to assign a reference to a target computing interface, which may have been transmitted from a user device (e.g., user device 301) using proxy endpoint 303. As another example, API gateway 305 may receive a request to modify a target computing interface, such as by adding, modifying, and/or removing a module of the target computing interface. In some embodiments, API gateway 305 may receive a reference and/or target computing interface, which may have been transmitted from a user device.

A reference may include a URL, API call, user identifier, device identifier, informational tag, and/or any other information for identifying an interface. In some embodiments, the reference may refer to a web resource (e.g., computing interface, module, image, etc., accessible using a URL and/or uniform resource identifier) and/or may specify a location of the web resource on a computer network (e.g., a location of a computing interface identified by the reference). In some embodiments, the location may be associated with the reference. In some embodiments the reference further specifies a mechanism (e.g., adapter, network path, etc.) for retrieving the web resource. In some embodiments, the reference may be user-generated, machine-generated, and/or a combination of both user-generated and machine-generated. For example, a reference may have a portion (e.g., a segment of a URL) that is defined by a machine, which may be unalterable by a user. As another example, a reference may have a portion (e.g., a segment of a URL) that is definable by a user (e.g., which may comprise a string of characters selectable by a user). Additionally or alternatively, API gateway 305 may receive a request to integrate at least one module into a computing interface, modify an existing module of a computing interface, and/or remove a module from a computing interface.

In some embodiments, a target computing interface may be configured to be accessible to only a set of predefined users and/or user devices. For example, a set of predefined users may be identified through authorization information (e.g., a password, cryptographic signature, etc.) received at a user device 301, and based on the authorization information, may be authenticated and/or authorized to request a service to be performed by a function provider to a computing interface.

At step 603, API gateway 305 may specify a function provider, which may be associated with the target computing interface. A function provider may be a modular provider, user device, or any other device capable of performing a service or combination of services in response to a request from a user device. For example, API gateway 305 may determine (e.g., based on a received request, reference, and/or target computing interface) a modular provider that maintains the target computing interface. By way of further example, API gateway 305 may specify a function provider based on a module and/or reference received at step 601. In some embodiments, such as after specifying the function provider, API gateway 305 may enable the target computing interface for configuration (e.g., as discussed with respect to steps 605 and 609) by the specified function provider. For example, API gateway 305 or other computing device may authorize transmission of and transmit a requested target computing interface when the requested computing interface is received from the specified function provider. For example, API gateway 305 may confirm a source of a computing interface by decrypting a key or signature associated with the specified function provider, which may be received with the initial request. As another example, API gateway 305 may transmit the target computing interface from a database to the specified function provider (e.g., a modular provider), so that it may configure the target computing interface. As yet another example, API gateway 305 may accept modified versions of the target computing interface from the specified function provider, accept modules from the specified function provider, integrate modules from the specified function provider into a computing interface, store a module and/or interface from the specified function provider in a database, and/or authorize any other operation associated with the target computing interface and specified function provider.

At step 605, API gateway 305 may associate a reference (e.g., received at step 601) with a target computing interface (e.g., stored at a modular provider and/or database 320). In some embodiments, API gateway 305 or another computing device may allow a user to generate mapping information for a reference-target pair. For example, API gateway 305 or another computing device may re-format the reference (e.g., to ensure that the reference is unique with respect to already existing references) and/or link the reference to the target computing interface (e.g., update a reference-interface pairing maintained by a modular provider, database, user device, consumer device, etc.). For example, associating a reference may include pairing the reference with an identifier of the target computing interface, storing the reference and/or identifier in a table stored by database 320, and/or embedding the reference within the target computing interface. In some embodiments, API gateway 305 may change a reference and/or reference pairing information based on a request from a user device or other computing device. In some embodiments, API gateway 305 may automatically change a reference and/or reference pairing information in response to a change of a target computing interface (e.g., a change to a module within a target computing interface). In some embodiments, the target computing interface may be configured, either prior to or after modification (e.g., performed at step 609) to provide extension mechanisms to enable at least one consumer device to extend existing functionality. For example, a target computing interface may include interactive graphical user interfaces, animations, images, etc., which may allow a user to perform additional functions. In some embodiments, the target computing interface may be configured to implement a plurality of modules from different libraries sharing a common programming interface (e.g., a common API). For example, a plurality of modules may be sourced from different libraries (e.g., libraries maintained at separate databases), but may be configured for a common Fluent API (e.g., an API that may be object-oriented, may include specific sequences of methods, and/or may configured in a domain-specific manner). Thus, even though modules may be sourced from different libraries, a single endpoint proxy and/or API gateway 305 may seamlessly interact with any or all of the modules. In some embodiments, a reference may be associated with the target computing interface according to a mapping rule, which may be defined by a user device 301, API gateway 305, and/or other computing device. A mapping rule may thus allow for rapid retrieval of computing interfaces using references.

At step 607, API gateway 305 may receive a module, which may have been received from a modular provider (e.g., modular provider 310A). In some embodiments, API gateway 305 may receive a module in response to a query sent to a modular provider from API gateway 305.

At step 609, at least one function provider (e.g., modular provider, user device 301, or other computing device) may integrate a module (e.g., received at step 605) into the target computing interface. In some embodiments, this step may have been previously authorized (e.g., as discussed with respect to step 603). In some embodiments, configuration (e.g., enabled at step 603), may include associating at least one module with the target computing interface. For example, in some embodiments, such as where the target computing interface comprises a page (e.g., webpage, which may be optimized for mobile device or desktop device viewing), the module may be added to the target computing interface. In some embodiments, at least one function provider may be configured to build a page associated with the reference (e.g., integrate multiple modules into a single page for display at a consumer device). In some embodiments, a module already existing within the target computing interface may be removed or modified. In some embodiments, adding, modifying, and/or removing a module may involve re-sizing at least one module of the target computing interface.

In some embodiments, the modular provider or another computing device may determine that a requested service (e.g., adding a new module to a computing interface) may cause a breaking change to the interface (e.g., may cause the interface to become inoperative and/or crash at a consumer device). Based on this determination, the modular provider (or API gateway 305) may terminate the request and/or transmit a warning to a user device explaining the potential breaking change. In some embodiments, the modular provider (or API gateway 305) may associate a reference (e.g., according to step 605) with the target computing interface after performing a service or combination or services (e.g., adding a module, re-formatting information within a module, etc.). For example, the modular provider (or API gateway 305) may de-associate a current reference with the target computing interface and may associate a new reference with the target computing interface. In some embodiments, the new reference may indicate that the target computing interface has been modified (e.g., a version number).

At step 611, API gateway 305 may provide a reference, which may be a reference assigned to a target computing interface at step 605. For example, a modular provider API gateway 305 may make the reference accessible at a database 320 (e.g., where the reference may be paired with its associated target computing interface). By way of further example, after performing a modification of a computing interface, a modular provider may store a reference associated with the computing interface at database 320. In some embodiments, providing the reference may include transmitting the reference to a user device 301 and/or a consumer device 401.

At step 613, API gateway 305 may provide a target computing interface, which may be a target computing interface associated with a reference at step 605 and/or modified at step 609. For example, gateway 305 may make the target computing interface accessible at a database 320 (e.g., where a reference may be paired with the target computing interface). In some embodiments, providing the target computing interface may include transmitting the target computing interface to a user device 301 and/or a consumer device 401 (e.g., according to interface provisioning process 400).

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for assigning a reference to a target computing interface, comprising:
    a memory storing instructions; and
    at least one processor configured to execute the instructions to perform operations comprising:
        receiving, from a user device: a reference, a target computing interface, and a request to assign the reference to the target computing interface;
        specifying a function provider associated with the target computing interface;
        enabling the target computing interface for configuration by the specified function provider;
        assigning the reference to the target computing interface;
        receiving a module from the function provider;
        integrating the module into the target computing interface to generate a modified target computing interface;
        determining a modified reference that is unique with respect to already existing references;
        changing the reference to the modified reference;
        de-associating the reference from the target computing interface;
        assigning the modified reference to the modified target computing interface; and
        providing the modified reference to at least one consumer device.

2. The system of claim 1, wherein the reference refers to a web resource and specifies a location of the web resource on a computer network.

3. The system of claim 2, wherein the reference further specifies a mechanism for retrieving the web resource.

4. The system of claim 1, wherein the reference comprises a uniform resource locator (URL).

5. The system of claim 1, wherein the target computing interface is further configured to provide extension mechanisms to enable the at least one consumer device to extend existing functionality.

6. The system of claim 1, wherein:
    the operations further comprise confirming a source of the received module based on a key or signature associated with the function provider; and
    the integrating of the module into the target computing interface is performed based on the confirmation of the source of the received module.

7. The system of claim 6, wherein the at least one module comprises a selectable element configured to direct to a destination when selected.

8. The system of claim 1, wherein a first portion of the reference is user-defined and a second portion of the reference is machine-defined.

9. The system of claim 6, wherein the specified function provider is configured to build a page associated with the reference.

10. The system of claim 1, wherein the target computing interface is configured to be accessible to a set of predefined users.

11. The system of claim 1, wherein the target computing interface is further configured to implement a plurality of modules from different libraries sharing a common programming interface.

12. A method for assigning a reference to a target computing interface, comprising:
    receiving, from a user device: a reference, a target computing interface, and a request to assign the reference to the target computing interface;
    specifying a function provider associated with the target computing interface;
    enabling the target computing interface for configuration by the specified function provider;
    assigning the reference to the target computing interface;
    receiving a module from the function provider;
    integrating the module into the target computing interface to generate a modified target computing interface;
    determining a modified reference that is unique with respect to already existing references;
    changing the reference to the modified reference;

de-associating the reference from the target computing interface;

assigning the modified reference to the modified target computing interface; and providing the modified reference to at least one consumer device.

13. The method of claim 12, wherein the reference refers to a web resource and specifies the location of the web resource on a computer network.

14. The method of claim 13, wherein the reference further specifies a mechanism for retrieving the web resource.

15. The method of claim 12, wherein the target computing interface is further configured to provide extension mechanisms to enable the at least one consumer device to extend existing functionality.

16. The method of claim 12, wherein:

the operations further comprise confirming a source of the received module based on a key or signature associated with the function provider; and the integrating of the module into the target computing interface is performed based on the confirmation of the source of the received module.

17. The method of claim 16, wherein the at least one module comprises a selectable element configured to direct to a destination when selected.

18. The method of claim 12, wherein a first portion of the reference is user-defined and a second portion of the reference is machine-defined.

19. The method of claim 16, wherein the specified function provider is configured to build a page associated with the reference.

20. A system for provisioning computing interfaces, comprising:

a memory storing instructions; and at least one processor configured to execute the instructions to perform operations comprising:

receiving, from a user device: a reference, a target computing interface, and a request to assign the reference to the target computing interface;

specifying a function provider associated with the target computing interface;

assigning the reference to the target computing interface;

receiving, from the function provider, at least one module;

integrating the at least one module into the target computing interface to generate a modified target computing interface;

determining a modified reference that is unique with respect to already existing references;

changing the reference to the modified reference;

de-associating the reference from the target computing interface;

assigning the modified reference to the modified target computing interface including the at least one module;

providing the modified reference to at least one consumer device; and providing, in response to a selection of the modified reference at a consumer device, the at least one module within the modified target computing interface.

* * * * *